(12) United States Patent
Abel et al.

(10) Patent No.: US 7,884,566 B2
(45) Date of Patent: Feb. 8, 2011

(54) ADAPTIVE SERVO CONTROL SYSTEM AND METHOD

(75) Inventors: Steve Abel, Chandler, AZ (US); Dwayne M. Benson, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 449 days.

(21) Appl. No.: 12/121,220

(22) Filed: May 15, 2008

(65) Prior Publication Data

US 2009/0284210 A1   Nov. 19, 2009

(51) Int. Cl.
G05B 13/02 (2006.01)
G05B 11/42 (2006.01)

(52) U.S. Cl. .................. 318/609; 318/610; 318/560

(58) Field of Classification Search .......... 318/560, 318/568.18, 568.22, 609, 610, 615
See application file for complete search history.

(56) References Cited

U.S. PATENT DOCUMENTS

| | | | |
|---|---|---|---|
| 3,493,826 A | 2/1970 | Wandrey | |
| 3,613,419 A | 10/1971 | Silva | |
| 3,882,368 A | 5/1975 | Carleton | |
| 4,298,833 A | 11/1981 | Edwards et al. | |
| 4,675,804 A | 6/1987 | Wiemer | |
| 4,727,303 A | 2/1988 | Morse et al. | |
| 4,983,099 A | 1/1991 | Tsai | |
| 5,119,005 A | 6/1992 | Tsai et al. | |
| 5,262,707 A | 11/1993 | Okazaki et al. | |
| 5,298,845 A | 3/1994 | DeBoer et al. | |
| 5,406,474 A * | 4/1995 | Hansen | 700/37 |
| 5,587,896 A * | 12/1996 | Hansen et al. | 700/28 |
| 5,694,016 A | 12/1997 | Heinkel | |
| 5,801,939 A | 9/1998 | Okazaki | |
| 6,515,442 B1 * | 2/2003 | Okubo et al. | 318/560 |
| 6,734,650 B2 | 5/2004 | Abel | |
| 6,831,809 B2 * | 12/2004 | Kagami et al. | 360/78.09 |
| 6,859,006 B2 | 2/2005 | Hayashi | |
| 6,898,039 B2 * | 5/2005 | Kobayashi et al. | 360/60 |
| 7,155,897 B2 | 1/2007 | Nakamura et al. | |
| 7,388,539 B2 * | 6/2008 | Whitehead et al. | 342/357.36 |
| 7,589,488 B2 * | 9/2009 | Kitazawa et al. | 318/609 |
| 2001/0028519 A1 * | 10/2001 | Tan et al. | 360/31 |
| 2003/0048562 A1 * | 3/2003 | Heydari et al. | 360/51 |
| 2010/0142082 A1 * | 6/2010 | Sakagami et al. | 360/75 |

* cited by examiner

*Primary Examiner*—Bentsu Ro
*Assistant Examiner*—Eduardo Colon
(74) *Attorney, Agent, or Firm*—Ingrassia Fisher & Lorenz, P.C.

(57) ABSTRACT

A system and method of implementing servomechanism control without rate feedback is provided. A position feedback signal is filtered using a non-linear lead-lag filter that has a variable frequency response to thereby generate a compensated position feedback signal. A position error signal is generated from a position command signal and a sensed position signal, and the frequency response of the non-linear lead-lag filter is varied in response to the position error signal. A compensated position error signal is generated from the commanded position signal and the compensated position feedback signal. The compensated position error signal is at least selectively filtered using a non-linear integral filter that has a variable gain to thereby at least selectively supply a filtered position error signal. The gain of the non-linear integral filter is varied in response to the compensated position error signal.

18 Claims, 8 Drawing Sheets

ADAPTIVE SERVO CONTROL SYSTEM AND METHOD

TECHNICAL FIELD

The present invention generally relates to feedback control systems, and more particularly to adaptive servo control systems and methods.

BACKGROUND

A typical feedback control system includes a plant and a controller. The plant may be a machine or other device, the operation of which is desired to be controlled. The controller receives an input reference or command signal and one or more feedback signals representative of one or more outputs of the plant. The controller, via a suitable control law (or filter or compensator or control), processes these signals and supplies one or more signals to the plant so that the plant operates consistent with the input command signal. Feedback control systems, such as this, have been, and continue to be, implemented in numerous and varied environments to control various types of machines or processes. For example, many systems include actuators that are used to controllably position one or more loads. These actuators are, in many instances, controlled using a servo control system.

Depending on the particular load that is being controlled, a servo control system may be subject to bi-directional loads and relatively high inertia. In these instances, the servo position control system will typically include a speed loop. The speed loop, if included, controls overshoot of speed or position, improves accuracy, and enhances stability. To implement the speed loop, speed is either measured directly or is derived from measured position, to supply a speed feedback signal. In both instances, precision sensing devices are used to measure speed or position. For example, a suitably precise tachometer may be used to measure speed, and a suitably precise resolver may be used to measure position. As may be appreciated, these speed or position sensing devices may add size, weight, complexity, and concomitant costs to the control loop. Hence, if the speed feedback signal could be eliminated from the speed loop, then the tachometer and/or the resolver could also be eliminated in favor of relatively less complex position sensors. For example, if the servo position control system includes a brushless DC motor, then relatively simple discrete Hall effect sensors, which may be used for motor commutation, may instead be used.

Without speed feedback, a position-only servo control system may suffer an undesirable amount of droop (position error) in the presence of high loads. As is generally known, this droop can be overcome by including an integrator in the position loop, thereby implementing PI (proportional-plus-integral) control. Unfortunately, the integrator may aggravate position overshoot, especially in the presence of aiding loads. As is also generally known, a lead-lag filter in the position loop may be included to combat overshoot and enhance stability. Moreover, if an integrator is included in the position loop, as described above, a lead-lag filter may also offset, at least partially, the above-noted drawbacks of the integrator. Unfortunately, the lead-lag filter may exhibit drawbacks of its own. For example, it may exhibit sensitivity to command step size, whereby a relatively small step command may cause undesirable overshoot and a relatively large step may command may cause excessive undershoot.

Hence, there is a need for a servo control system that does not rely on relatively complex and costly sensing devices and/or does not exhibit an undesirable amount of droop in the presence of high loads and/or does not exhibit undesirable position overshoot and/or does not exhibit sensitivity to command step size. The present invention addresses one or more of these needs.

BRIEF SUMMARY

In one embodiment, and by way of example only, a servo position control includes a non-linear lead-lag filter, a comparator, and a non-linear integral filter. The non-linear lead-lag filter is adapted to receive a position error signal and a position feedback signal. The position error signal is representative of a difference between a commanded position signal and the position feedback signal. The non-linear lead-lag filter is operable to exhibit a frequency response that varies in response to the position error signal, and is further operable to filter the position feedback signal and supply a compensated position feedback signal. The comparator is adapted to receive the commanded position signal and is coupled to receive the compensated position feedback signal from the non-linear lead-lag filter. The comparator is responsive to the commanded position signal and the compensated position feedback signal to supply a compensated position error signal. The non-linear integral filter is coupled to receive the compensated position error signal and is operable to exhibit a gain that varies in response to the compensated position error signal. The non-linear integral filter is further operable to at least selectively filter the compensated position error signal and supply a filtered position error signal.

In another embodiment, a servo-motor position control system includes a motor, a current control, and a position control. The motor is configured to be controllably energized. The current control is coupled to receive at least a current command signal and a current feedback signal and is operable, in response thereto, to controllably energize the motor. The position control is adapted to receive a position command signal and a position feedback signal and is operable, in response thereto, to supply the current command signal to the current control. The position control includes a non-linear lead-lag filter, a comparator, and a non-linear integrator. The non-linear lead-lag filter is adapted to receive a position error signal and the position feedback signal. The position error signal is representative of a difference between the position command signal and the position feedback signal. The non-linear lead-lag filter is operable to exhibit a frequency response that varies in response to the position error signal, and is further operable to filter the position feedback signal and supply a compensated position feedback signal. The comparator is adapted to receive the position command signal and is coupled to receive the compensated position feedback signal from the non-linear lead-lag filter. The comparator is responsive to the position command signal and the compensated position feedback signal to supply a compensated position error signal. The non-linear integral filter is coupled to receive the compensated position error signal and is operable to exhibit a gain that varies in response to the compensated position error signal. The non-linear integral filter is further operable to at least selectively filter the compensated position error signal and supply a filtered position error signal.

In still a further embodiment, a method of controlling servomechanism position includes filtering a position feedback signal using a non-linear lead-lag filter that has a variable frequency response to thereby generate a compensated position feedback signal. A position error signal is generated from a position command signal and a sensed position signal, and the frequency response of the non-linear lead-lag filter is varied in response to the position error signal. A compensated position error signal is generated from the commanded position signal and the compensated position feedback signal. The compensated position error signal is at least selectively filtered using a non-linear integral filter that has a variable gain to thereby at least selectively supply a filtered position error signal. The gain of the non-linear integral filter is varied in response to the compensated position error signal Furthermore, other desirable features and characteristics of the control system and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
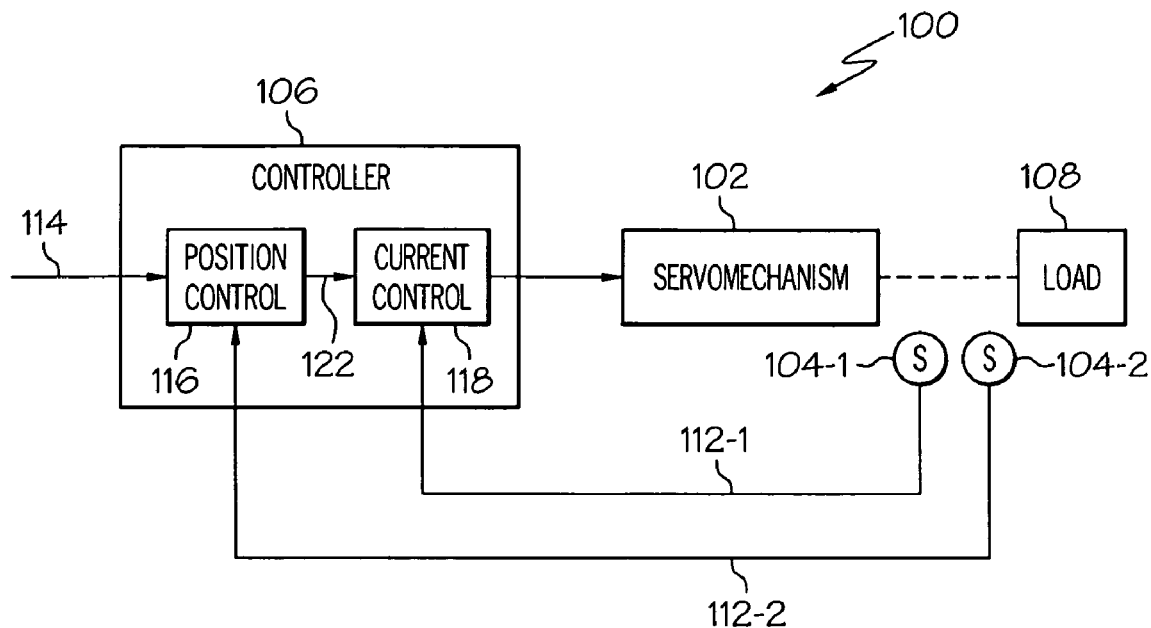
FIG. 1 depicts a functional block diagram of a servomechanism control system.

Turning now to FIG. 1, a functional block diagram of a servomechanism control system 100 is depicted, and includes a servomechanism 102, a plurality of sensors 104 (e.g., 104-1, 104-2), and a controller 106. The servomechanism 102, at least in the depicted embodiment, is used to drive a load 108. It will be appreciated that the servomechanism 102 may be implemented as any one of numerous types of suitable devices. Some exemplary implementations include various hydraulic, pneumatic, or electric devices, just to name a few. In the depicted embodiment, however, the servomechanism 102 is an electric device, such as an electric motor. In a particular preferred embodiment, the servomechanism is implemented using a brushless DC motor. No matter its particular implementation, the servomechanism 102 is controlled, via the controller 106, to supply a drive force to the load 108 to, for example, move the load 108 to a commanded position.

The sensors 104 are configured to sense various parameters and supply feedback signals 112 (e.g., 112-1, 112-2) representative of the sensed parameters to the controller 106. These sensed parameters may vary, but in the depicted embodiment, in which the servomechanism 102 is implemented as a motor, the sensed parameters include motor current and motor position (e.g., motor rotor rotational position). Various numbers and types of sensors 104 may be used to sense these parameters and supply the feedback signals representative thereof to the controller 106. Suitable sensors 104-1 that may be used to sense motor current, and supply a motor current feedback signal 112-1, include sense resistors or linear output Hall effect sensors. Suitable sensors 104 that may be used to sensor motor rotor position, and supply a motor position feedback, include discrete Hall effect sensors or a synchro. Preferably, however, the same sensors that are used for motor commutation are also used to supply the position feedback signal 112-2 to the controller 106.

The controller 106 is coupled to receive a position command signal 114 and the feedback signals 112. The position command signal 114 may be supplied from any one of numerous non-illustrated external components or systems. The controller 106, in response to the position command signal 114 and the feedback signals 112, controllably energizes the motor 102 from a non-illustrated power source to move the load 108 to the commanded position. In the depicted embodiment, the controller 106 implements this functionality via a position control 116 and a current control 118. It is noted, however, that in some embodiments the controller 106 could, if needed or desired, be implemented without the current control 118, as it is a conventional technology.

Figure 2:
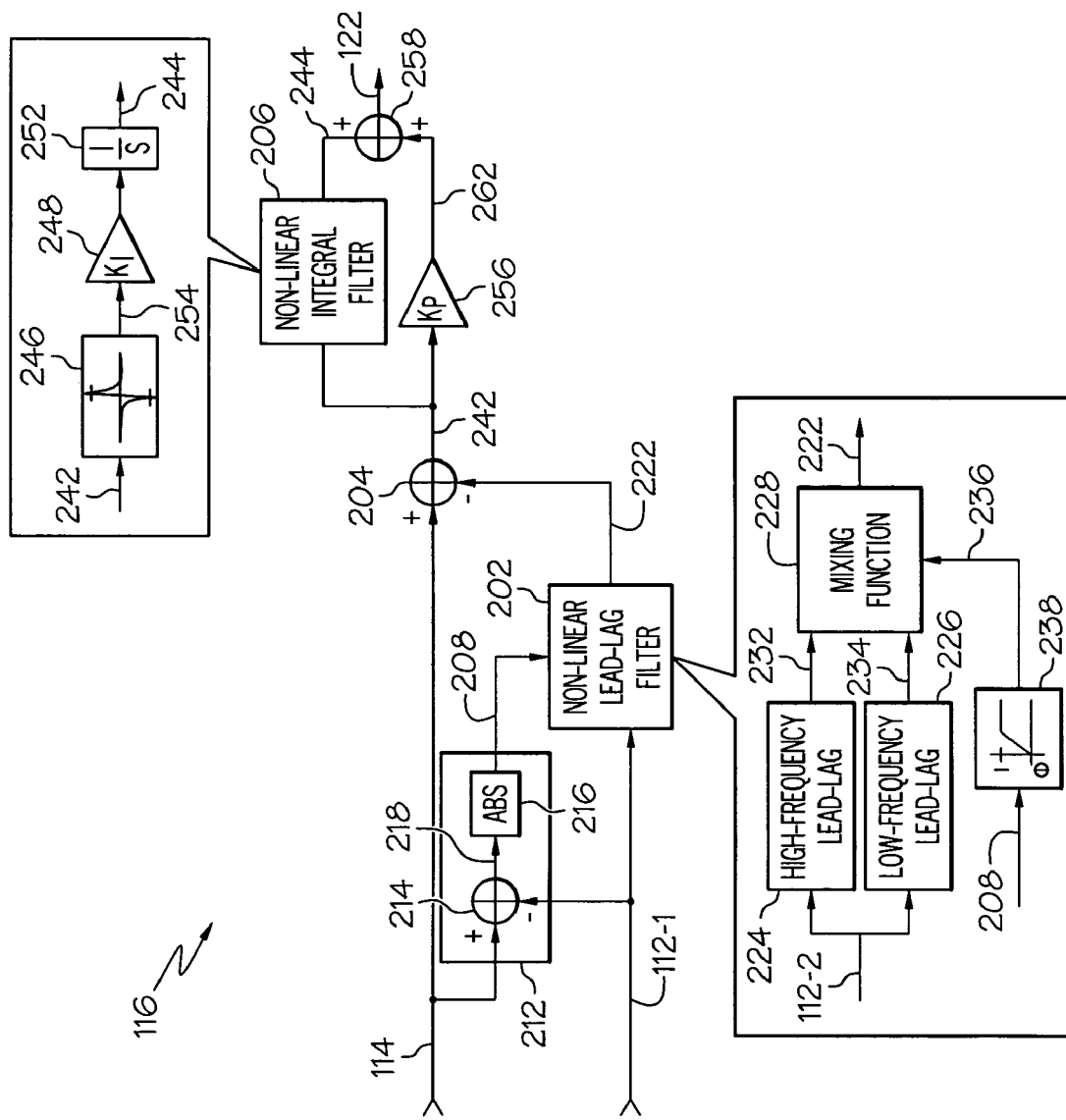
FIG. 2 depicts a functional block diagram of an exemplary position control that may be used to implement the system of FIG. 1.
Figure 4A:
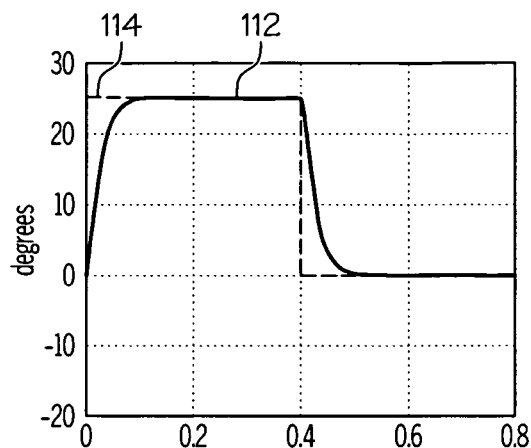
FIGS. 4-9 depict step responses of servomechanism position control systems that include controllers of progressive sophistication.
Figure 4B:
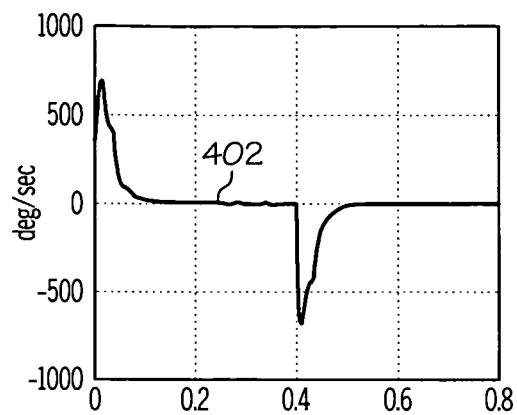
Figure 4C:
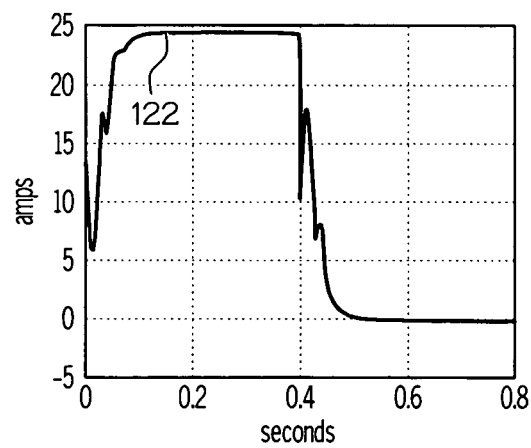
Figure 4D:
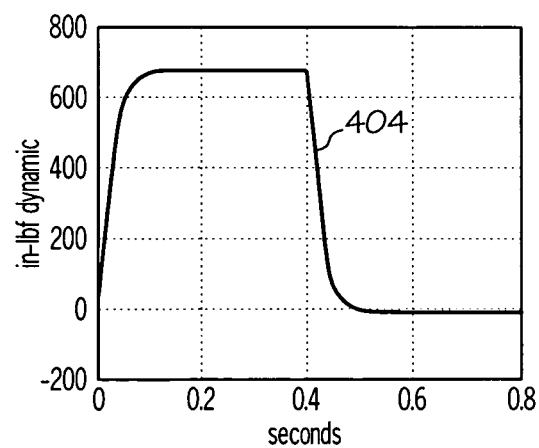
Figure 5A:
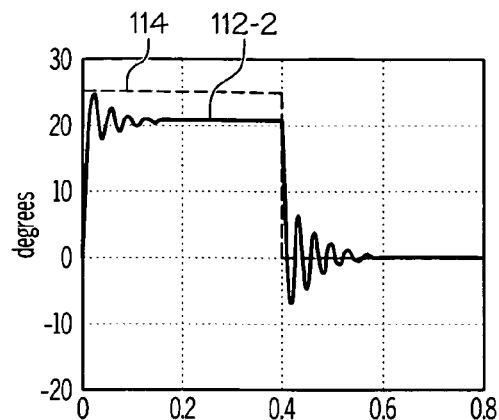
Figure 5B:
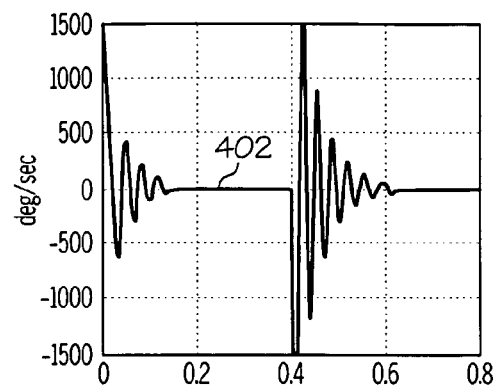
Figure 5C:
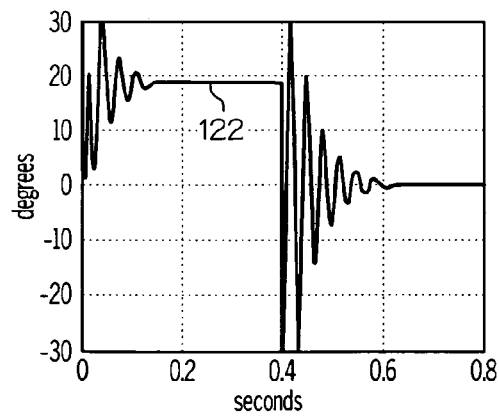
Figure 5D:
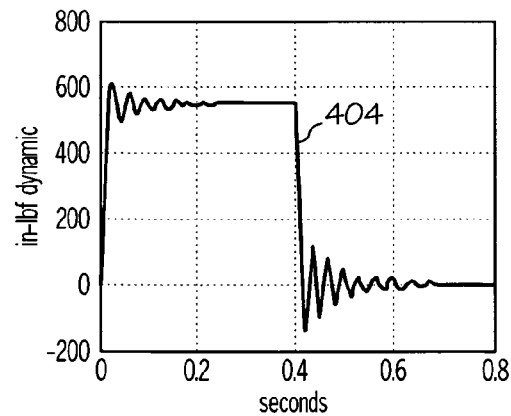
Figure 6A:
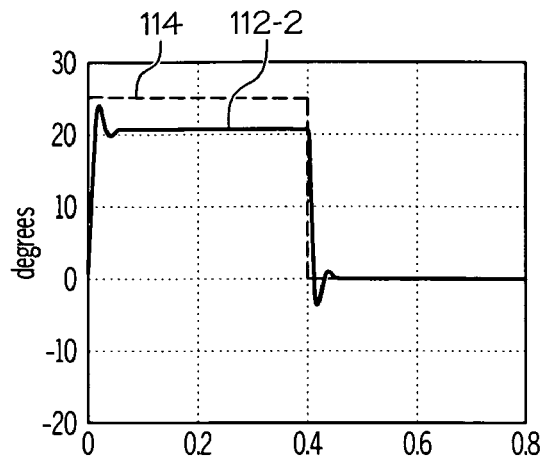
Figure 6B:
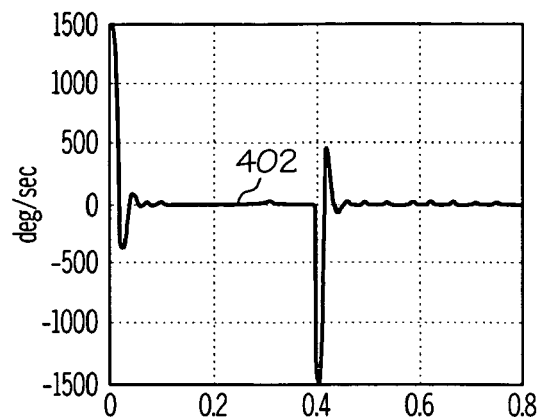
Figure 6C:
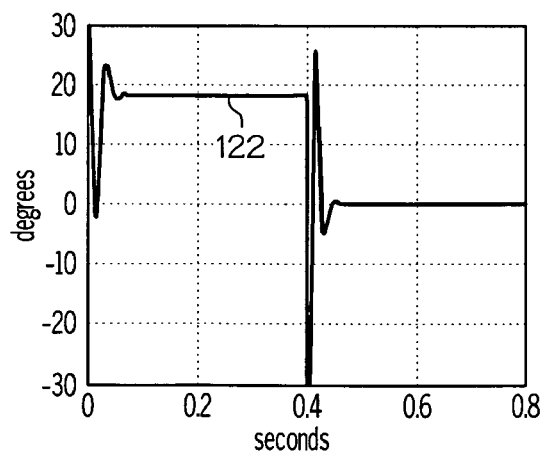
Figure 6D:
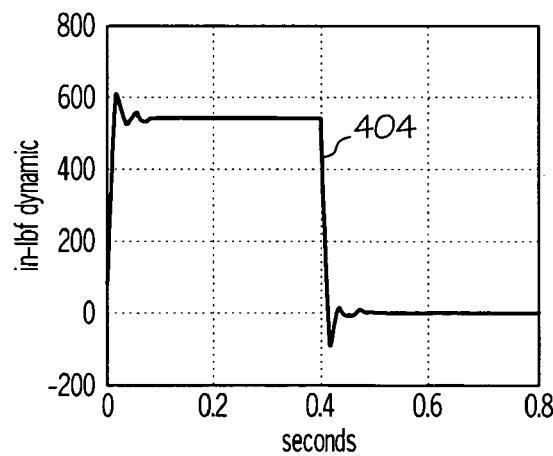
Figure 7A:
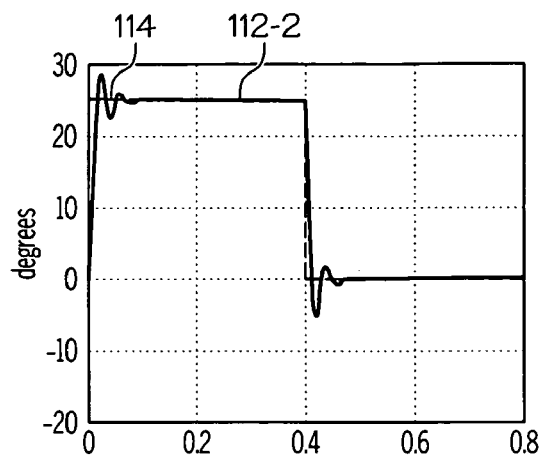
Figure 7B:
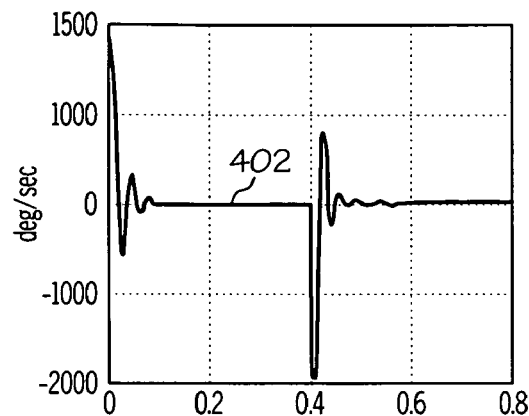
Figure 7C:
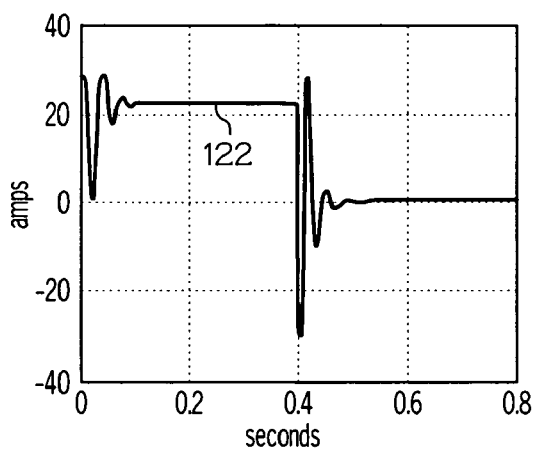
Figure 7D:
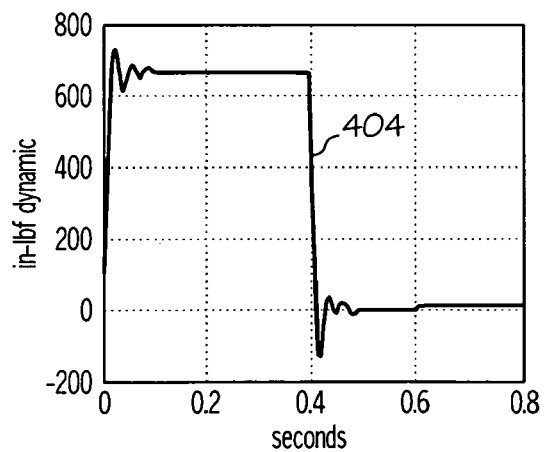
Figure 8A:
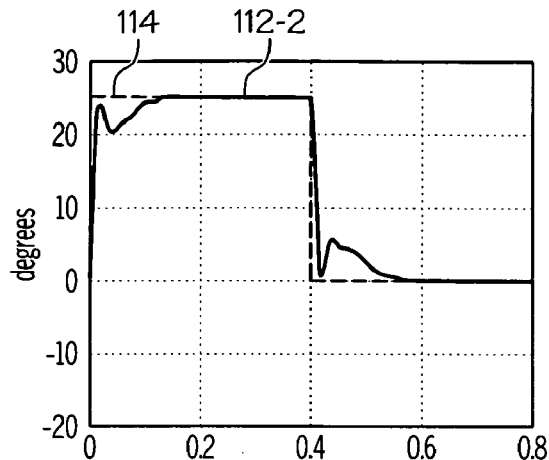
Figure 8B:
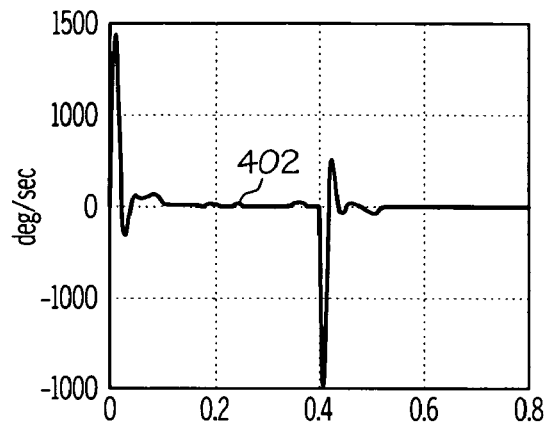
Figure 8C:
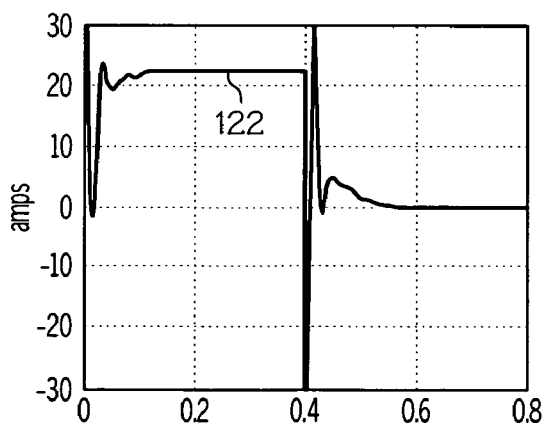
Figure 8D:
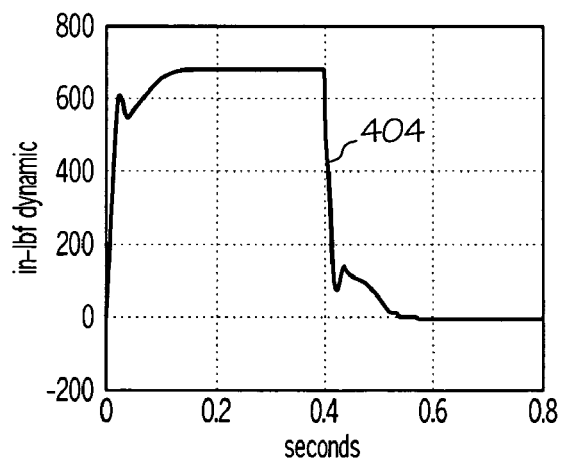
Figure 9A:
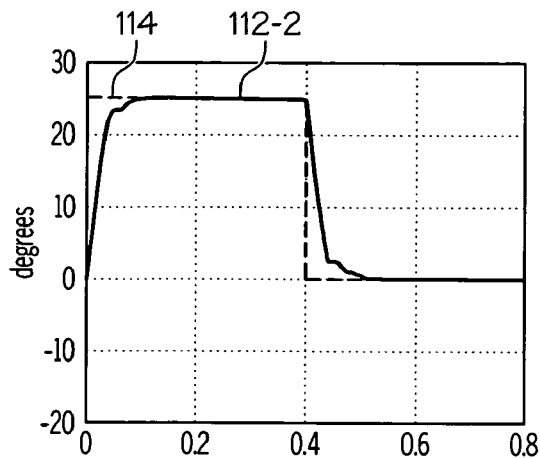
Figure 9B:
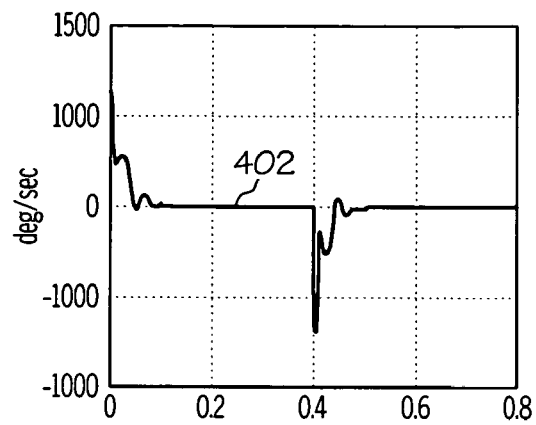
Figure 9C:
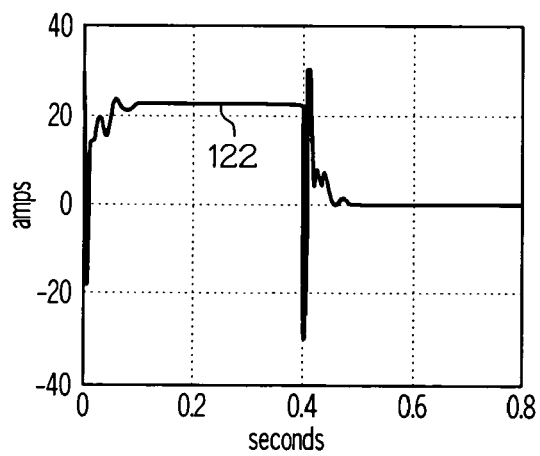
Figure 9D:
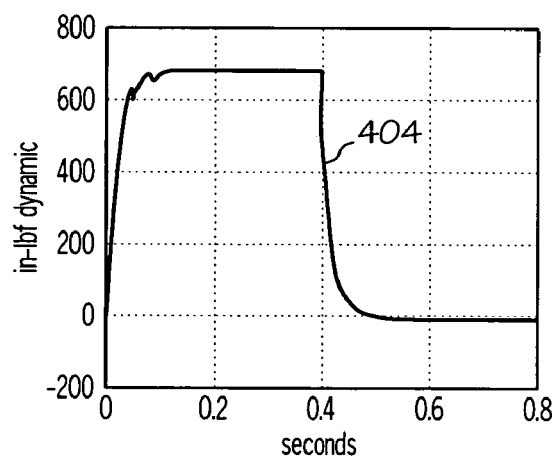

The position control 116 is coupled to receive the position command signal 114 and the position feedback signal 112-2 and is operable, in response to these signals, to supply a current command signal 122 to the current control 118. The current control 118 is coupled to receive the current feedback signal 112-1 and the current command signal 122 and is operable, in response to these signals, to controllably commutate and energize the phase windings of the motor 102 to move the load 108 to the commanded position. It will be appreciated that the current control 118 may be implemented using any one of numerous current controls, now known or developed in the future. A detailed description of the current control is not needed to fully describe or enable the invention, and as such will not be further described. However, a particular preferred embodiment of the position control 116 is depicted in FIG. 2 and will now be described. Before doing so, it is noted that the position control 116 (and the current control 118) could be implemented using software, firmware, analog hardware devices, or various combinations thereof.

With reference now to FIG. 2, it is seen that the position control 116 includes a non-linear lead-lag filter 202, a comparator 204, and a non-linear integrator 206. The non-linear lead-lag filter 202 is coupled to receive a position error signal 208 and the position feedback signal 112-2. The position error signal 208 is representative of the difference between the commanded position, as represented by the position command signal 114, and the actual position, as represented by the position feedback signal 112-1. In the depicted embodiment, the position error signal 208 is preferably representative of the magnitude of the difference between the commanded position and the actual position, and is supplied via a position error magnitude determination circuit 212. The position error magnitude determination circuit 212 includes a comparator 214 and an absolute value determination function 216. The comparator 214 is coupled to receive the position command signal 114 and the position feedback signal 112-2, and is responsive to these signals to supply a mathematically-signed (e.g., +/−) position error signal 218 to the absolute value determination function 216. The absolute value determination function 216, upon receipt of the mathematically-signed position error signal 218, determines the absolute value thereof and supplies the position error signal 208 to the non-linear lead-lag filter 202.

The non-linear lead-lag filter 202 is coupled to receive the position error signal 208 and the position feedback signal 112-1. The non-linear lead-lag filter 202, which filters the position feedback signal 112-1 and thereby supplies what is referred to herein as a compensated position feedback signal 222, is configured to exhibit a frequency response that varies in response to the position error signal 208. More specifically, the non-linear lead-lag filter 202 is configured to implement a relatively high-frequency filter, a relatively low-frequency filter, or a weighted blending of the high-frequency and low-frequency filter. The particular frequency response that the non-linear lead-lag filter 202 exhibits is dependent upon the magnitude of the position error (e.g., the position error signal 208). In particular, for relatively small position error magnitudes the non-linear lead lag filter 202 will implement a relatively high-frequency filter, for relatively large position error magnitudes the non-linear lead-lag filter 202 will implement a relatively low-frequency filter, and for position error magnitudes in between the non-linear lead-lag filter 202 will implement the weighted blending of high-frequency and low-frequency filters.

The non-linear lead-lag filter 202 may be variously configured to implement the above described functionality. In the depicted embodiment, however, it is implemented using two lead-lag filters—a high-frequency lead-lag filter 224 and a low-frequency lead-lag filter 226—and a mixing function 228. The high-frequency lead-lag filter 224 is coupled to receive the position feedback signal 112-2 and, in response, supplies a first filtered position feedback signal 232 to the mixing function 228. The low-frequency lead-lag filter 226 is also coupled to receive the position feedback signal 112-2 and, in response, supplies a second filtered position feedback signal 234 to the mixing function 228.

The mixing function 228 is coupled to receive the first and second filtered position feedback signals 232, 234, and is also coupled to receive a filter weighting signal 236. The mixing function 228, in response to these signals, supplies the compensated position feedback signal 222 to the comparator 204. More specifically, the mixing function 228, in response to the filter weighting signal 236, applies suitable weighting to the first and second filtered position feedback signals 232, 234. It may thus be appreciated that the compensated position feedback signal 222 is a weighted blending of the first and second filtered position feedback signals 232, 234.

Figure 3:
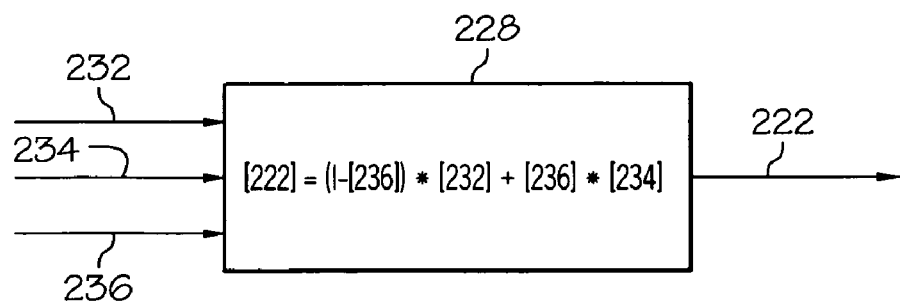
FIG. 3 depicts a representation of a mixing function, which forms part of the non-linear lead-lag filter, and that may be used to implement a portion of the exemplary position of FIG. 2.

The weighting that is applied to the first and second filtered position feedback signals 232, 234 is dependent upon the position error. In particular, and as FIG. 2 further depicts, the non-linear lead-lag filter 202 further includes a mixing weight determination function 238. The mixing weight determination function 238 is coupled to receive the position error signal 208 from the position error magnitude determination circuit 212, and in response supplies the filter weighting signal 236 to the mixing function 228. As FIG. 2 readily depicts, the filter weighting signal 236 is representative of a value from zero (0) to one (1), inclusive. In particular, the filter weighting signal 236 is representative of zero (0) when the position error is relatively small (or non-existent), and is representative of one (1) when the position error is relatively large. It will be appreciated that the specific position errors below which the filter weighting signal 236 is representative of zero (0) and above which the filter weighting signal 236 is representative of one (1) may vary, and may be selected to meet particular system response characteristics. In one particular embodiment, the filter weighting signal 236 is representative of zero (0) whenever the magnitude of the position error is less than or equal to a first predetermined position error value, and is representative of one (1) whenever the magnitude of the position error is greater than or equal to a second predetermined position error value. These values may vary, but in one embodiment the first predetermined position error value is 5 rotational degrees, and the second predetermined position error value is 15 rotational degrees. The manner in which the mixing function 228 responds to the filter weighting signal 236 to weight the first and second filtered position feedback signals 232, 234 may vary. A particular manner that may be implemented is depicted in FIG. 3, and with quick reference thereto will now be described.

The depicted mixing function 228 weights the first and second filtered position feedback signals 232, 234 by implementing a mathematical algorithm. That is, when the position error is less than or equal to the first predetermined position error value (and thus the filter weighting signal 236 is representative of zero), the compensated position feedback signal 222 will be equivalent to the first filtered position feedback signal 232. Conversely, when the position error is greater than or equal to the second predetermined position error value (and thus the filter weighting signal 236 is representative of one), the compensated position feedback signal 222 will be equivalent to the second filtered position feedback signal 234. For position errors between the first and second predetermined position error values, during which the filter weighting signal 236 is representative of a value between zero and one, the compensated position feedback signal 222 will be a blending of the first and second filtered position feedback signals 232, 234.

Returning once again to FIG. 2, the remainder of the position control 116 will now be described. The comparator 204 is coupled to receive the position command signal 114 and the compensated position feedback signal 222 from the non-linear lead-lag filter 202. The comparator 204, in response to the position command signal 114 and the compensated position feedback signal 222, supplies what is referred to herein as a compensated position error signal 242. The comparator 204 may be implemented using any one of numerous known circuits or devices for implementing its functionality, which is basically determining the mathematical difference between the position command signal 114 and the compensated position feedback signal 222. No matter how it is specifically implemented, the comparator 204 supplies the compensated position error signal 242 to the non-linear integral filter 206.

The non-linear integral filter 206 is coupled to receive the compensated position error signal 242, and is configured to exhibit a gain that varies in response to the compensated position error signal 242. The non-linear integral filter 206, implementing this variable gain, at least selectively filters the compensated position error signal 242 to supply what is referred to herein as a filtered position error signal 244. More specifically, the non-linear integral filter 206 is configured such that it is smoothly enabled, at a variable gain, when the compensated position error signal 242 is representative of a relatively small position error. Conversely, when the compensated position error signal 242 is representative of relatively larger position errors, the non-linear integral filter 206 is non-enabled (e.g., exhibits a zero gain).

The non-linear integral filter 206 may be variously configured to implement the above described functionality. In the depicted embodiment, however, it is implemented using a variable gain function 246, a fixed-gain integral amplifier 248, and an integrator 252. The variable gain function 246 is coupled to receive the compensated position error signal 242 from the comparator 204, and in response applies a variable gain to the compensated position error signal 242 to thereby supply what is referred to as an attenuated position error signal 254. More specifically, if the magnitude of the position error, as represented by the compensated position error signal 242, is greater than or equal to a predetermined position error magnitude, then the variable gain function 246 applies a zero gain to the compensated position error signal 242. As a result, the compensated position error signal 242 is fully attenuated and the non-linear integral filter 206 is basically non-enabled. Conversely, if the magnitude of the position error, as represented by the compensated position error signal 242, is less than the predetermined position error, then the variable gain function 246 applies a non-zero gain to the compensated position error signal 242. The specific non-zero gain that the variable gain function 246 applies to the compensated position error signal 242 will vary between zero and one, depending on the magnitude of the position error. Moreover, the specific non-zero gain values associated with the position errors below the predetermined position error magnitude may vary, and may be selected to meet particular system response characteristics. It will additionally be appreciated that the predetermined position error magnitude may vary, and may also be selected to meet particular system response characteristics. In a particular preferred embodiment, the predetermined position error magnitude is 5 rotational degrees.

No matter the specific non-zero gain values and the specific predetermined position error magnitude that are selected, the attenuated position error signal 254 is supplied to the fixed-gain integral amplifier 248. The fixed-gain integral amplifier 248 applies a fixed gain to the attenuated position error signal 254, and then supplies this signal to the integrator 252, which appropriately filters the signal and supplies the filtered position error signal 244. It will be appreciated that the fixed gain integral amplifier 248 and the integrator 252 may be implemented using any one of numerous circuit configurations or devices, now known or developed in the future, for implementing a fixed gain amplifier and an integral filter, respectively.

From the above description of the non-linear integral filter 206 it may be appreciated that it is configured to be smoothly engaged only when the position error, as represented by the compensated position error signal 242, is relatively small (e.g., +/−5 rotational degrees). Thus, the integrator function implemented by the non-linear integral filter 206 does not have sufficient time to wind up and cause a position overshoot.

In addition to the non-linear lead-lag filter 202, the comparator 204, and the non-linear integral filter 206, the depicted position control 116 further includes a fixed-gain proportional amplifier 256 and a summer 258. The fixed-gain proportional amplifier 256 is also coupled to receive the compensated position error signal 242 from the comparator 204 and, in response, supplies an amplified position error signal 262 to the summer 258. The summer 258 is coupled to receive the filtered position error signal 244 from the non-linear integral filter 206 and the amplified position error signal from the fixed-gain proportional amplifier 256. The summer 258, in response to the filtered position error signal 244 and the amplified position error signal 262, supplies a signal that is at least representative of the mathematical summation of these signals. In the depicted embodiment, this signal is the above-mentioned current command signal 122.

The servomechanism control system 100 described herein exhibits good stability, minimal overshoot, excellent accuracy, and good speed regulation, without the cost, weight, complexity, and size envelope associated with a tachometer or resolver. To provide additional supportive evidence of the stability, minimal overshoot, accuracy, and speed regulation associated with the described control system 100, FIGS. 4-9 depict step responses of systems 100 that include controllers 106 of progressive sophistication. In each case, the system 100 is used to implement an angular position control actuation system having a range of +/−30 rotational degrees and being subjected to restoring load forces, and what is graphically depicted are the position command signal 114, the position feedback signal 112-2, the rotational speed 402, the current command signal 122, and the load 404.

Referring first to FIG. 4, the depicted system response is for a controller 106 that is configured to implement rate feedback, and thus includes a tachometer or resolver. As may be seen, with this controller 106 configuration the system exhibits controlled rate and no overshoot. The system response depicted in FIG. 5 is for a controller that does not include rate feedback, and with no position loop integrator or lead-lag filter. This system exhibits excessive overshoot, poor stability, and excessive droop due to the restoring load. The peak rate is also unreasonably high (e.g., three times higher than the system response depicted in FIG. 4).

The system response depicted in FIG. 6 is for a controller that includes a modest, fixed lead-lag filter in the position feedback path. This added feature helps stabilize the system, but still exhibits modest overshoot and excessive droop. As FIG. 7 depicts, if a linear integrator is added to the position loop, the droop issue is corrected but the system still suffers excessive overshoot and high rates. However, as depicted in FIG. 8, if the position loop integrator is configured as described above (e.g., as the non-linear integral filter 206) so that it is enabled only when the position error magnitude is less than 5 rotational degrees, then the overshoot is eliminated. Nonetheless, the rates are still excessive.

Turning now to FIG. 9, the depicted system response is for the controller 106 described herein, and thus further includes the non-linear lead-lag filter 202. Now, the system exhibits no overshoot, a controlled rate, and no position droop. By comparing the system responses depicted in FIGS. 4 and 9, it is seen that this final configuration, which does not include rate feedback, exhibits a system response that is similar to that of a system with rate feedback.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A servo position control, comprising:
   a non-linear lead-lag filter adapted to receive a position error signal and a position feedback signal, the position error signal representative of a difference between a commanded position signal and the position feedback signal, the non-linear lead-lag filter operable to exhibit a frequency response that varies in response to the position error signal, the non-linear lead lag filter further operable to filter the position feedback signal and supply a compensated position feedback signal;
   a comparator adapted to receive the commanded position signal and coupled to receive the compensated position feedback signal from the non-linear lead-lag filter, the comparator responsive to the commanded position signal and the compensated position feedback signal to supply a compensated position error signal; and
   a non-linear integral filter coupled to receive the compensated position error signal and operable to exhibit a gain that varies in response to the compensated position error signal, the non-linear integral filter further operable to at least selectively filter the compensated position error signal and supply a filtered position error signal.

2. The control of claim 1, further comprising:
a fixed-gain proportional amplifier coupled to receive the compensated position error signal and operable to supply an amplified position error signal.

3. The control of claim 2, further comprising:
a summer coupled to receive the filtered position error signal and the amplified position error signal and operable, in response thereto, to supply a command signal at least representative of a mathematical summation of the filtered position error signal and the amplified position error signal.

4. The control of claim 3, wherein the command signal is a current command signal.

5. The control of claim 1, wherein the non-linear lead-lag filter comprises:
a high-frequency lead-lag filter coupled to receive the position feedback signal and operable, in response thereto, to supply a first filtered position feedback signal;
a low-frequency lead-lag filter coupled to receive the position feedback signal and operable, in response thereto, to supply a second filtered position feedback signal; and
a mixing function coupled to receive the first and second filtered position feedback signals and a filter weighting signal and operable, in response thereto, to supply the compensated position feedback signal.

6. The control of claim 5, wherein:
the compensated position feedback signal is a weighted blending of the first and second filtered position feedback signals; and
the mixing function is responsive to the filter weighting signal to apply suitable weighting to the first and second position feedback signals.

7. The control of claim 1, wherein the position error signal is representative of a magnitude of the difference between the commanded position signal and the position feedback signal, and wherein the control further comprises:
a position error magnitude determination circuit coupled to receive the commanded position signal and the position feedback signal and operable, in response thereto, to supply the position error signal.

8. The control of claim 7, wherein the position error magnitude determination circuit comprises:
a second comparator adapted to receive the commanded position signal and the position feedback signal, the second comparator responsive to the commanded position signal and the position feedback signal to supply a mathematically-signed position error signal; and
an absolute value determination function adapted to receive the mathematically-signed position error signal and operable, in response thereto, to determine the absolute value thereof and supplies the position error signal.

9. The control of claim 1, wherein the non-linear integral filter comprises:
a variable gain function coupled to receive the compensated position error signal and operable, in response thereto, to apply a variable gain to the position error signal to thereby supply an attenuated position error signal;
a fixed-gain integral amplifier coupled to receive, and apply a fixed gain to, the attenuated position error signal to thereby supply an integral amplifier output signal; and
an integrator coupled to receive and filter the integral amplifier output signal to thereby supply the filtered position error signal.

10. A servo-motor position control system, comprising:
a motor configured to be controllably energized;
a current control coupled to receive at least a current command signal and a current feedback signal and operable, in response thereto, to controllably energize the motor; and
a position control adapted to receive a position command signal and a position feedback signal and operable, in response thereto, to supply the current command signal to the current control, the position control comprising:
a non-linear lead-lag filter adapted to receive a position error signal and the position feedback signal, the position error signal representative of a difference between the position command signal and the position feedback signal, the non-linear lead-lag filter operable to exhibit a frequency response that varies in response to the position error signal, the non-linear lead lag filter further operable to filter the position feedback signal and supply a compensated position feedback signal;
a comparator adapted to receive the position command signal and coupled to receive the compensated position feedback signal from the non-linear lead-lag filter, the comparator responsive to the position command signal and the compensated position feedback signal to supply a compensated position error signal; and
a non-linear integral filter coupled to receive the compensated position error signal and operable to exhibit a gain that varies in response to the compensated position error signal, the non-linear integral filter further operable to at least selectively filter the compensated position error signal and supply a filtered position error signal.

11. The system of claim 10, further comprising:
a fixed-gain proportional amplifier coupled to receive the compensated position error signal and operable to supply an amplified position error signal.

12. The system of claim 11, further comprising:
a summer coupled to receive the filtered position error signal and the amplified position error signal and operable, in response thereto, to supply a command signal at least representative of a mathematical summation of the filtered position error signal and the amplified position error signal.

13. The system of claim 10, wherein the non-linear lead-lag filter comprises:
a high-frequency lead-lag filter coupled to receive the position feedback signal and operable, in response thereto, to supply a first filtered position feedback signal;
a low-frequency lead-lag filter coupled to receive the position feedback signal and operable, in response thereto, to supply a second filtered position feedback signal; and
a mixing function coupled to receive the first and second filtered position feedback signals and a filter weighting signal and operable, in response thereto, to supply the compensated position feedback signal.

14. The system of claim 13, wherein:
the compensated position feedback signal is a weighted blending of the first and second filtered position feedback signals; and
the mixing function is responsive to the filter weighting signal to apply suitable weighting to the first and second position feedback signals.

15. The system of claim 10, wherein the position error signal is representative of a magnitude of the difference between the commanded position signal and the position feedback signal, and wherein the control further comprises:

a position error magnitude determination circuit coupled to receive the commanded position signal and the position feedback signal and operable, in response thereto, to supply the position error signal.

16. The system of claim 15, wherein the position error magnitude determination circuit comprises:

a second comparator adapted to receive the commanded position signal and the position feedback signal, the second comparator responsive to the commanded position signal and the position feedback signal to supply a mathematically-signed position error signal; and an absolute value determination function adapted to receive the mathematically-signed position error signal and operable, in response thereto, to determine the absolute value thereof and supplies the position error signal.

17. The system of claim 10, wherein the non-linear integral filter comprises:

a variable gain function coupled to receive the compensated position error signal and operable, in response thereto, to apply a variable gain to the position error signal to thereby supply an attenuated position error signal;

a fixed-gain integral amplifier coupled to receive, and apply a fixed gain to, the attenuated position error signal to thereby supply an integral amplifier output signal; and an integrator coupled to receive and filter the integral amplifier output signal to thereby supply the filtered position error signal.

18. A method of controlling servomechanism position, comprising the steps of:

filtering a position feedback signal using a non-linear lead-lag filter to thereby generate a compensated position feedback signal, the non-linear lead-lag filter having a variable frequency response;

generating a position error signal from a position command signal and a sensed position signal;

varying the frequency response of the non-linear lead-lag filter in response to the position error signal;

generating a compensated position error signal from the commanded position signal and the compensated position feedback signal;

at least selectively filtering the compensated position error signal using a non-linear integral filter to thereby at least selectively supply a filtered position error signal, the non-linear integral filter having a variable gain; and varying the gain of the non-linear integral filter in response to the compensated position error signal.

* * * * *